Jan. 30, 1951  E. S. WELCH, JR  2,539,646
HIGH-FREQUENCY PROGRESSIVE BONDING APPARATUS

Filed March 19, 1947  4 Sheets-Sheet 1

Inventor
Edward Sohier Welch Jr.
By his Attorney

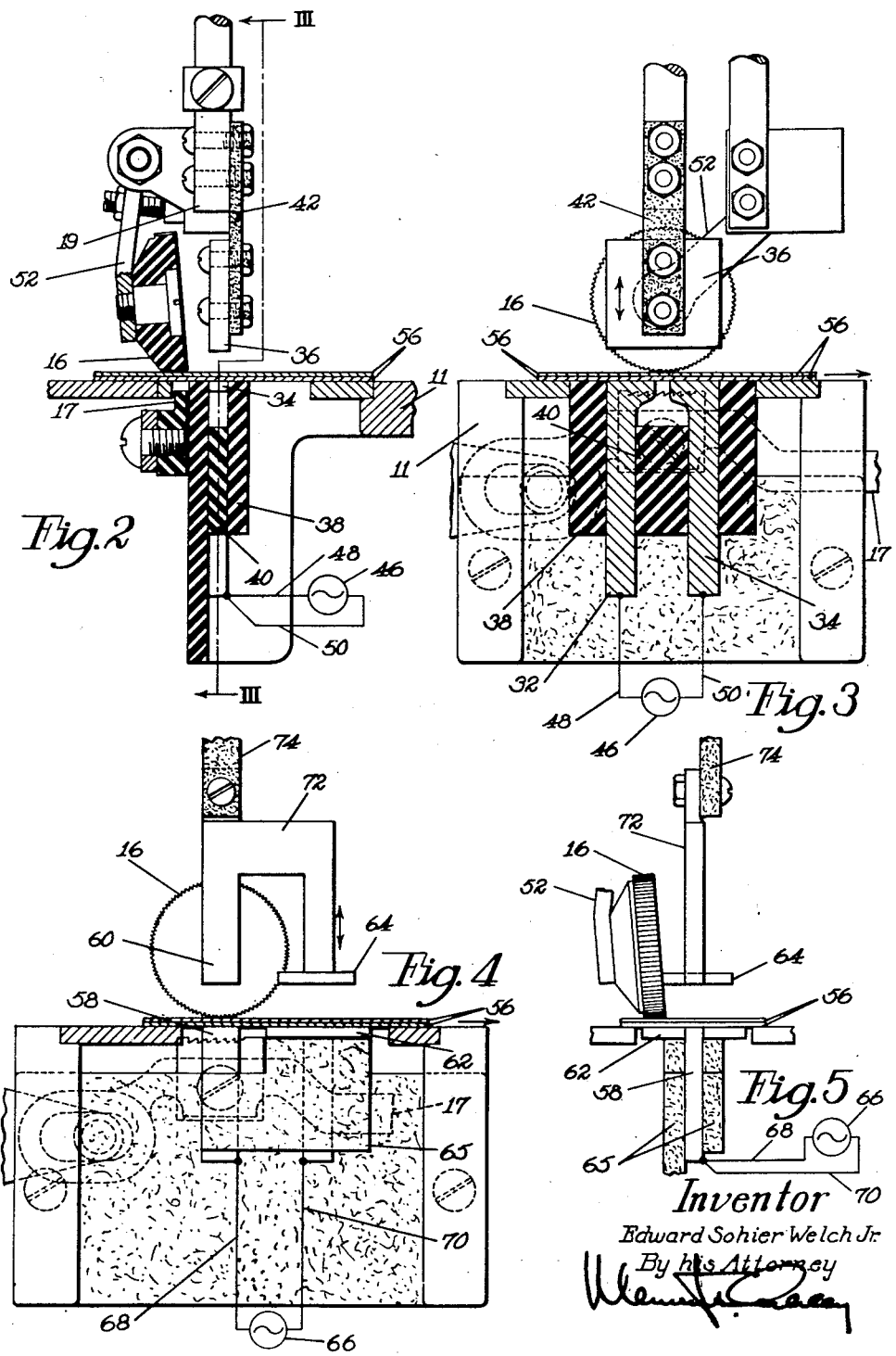

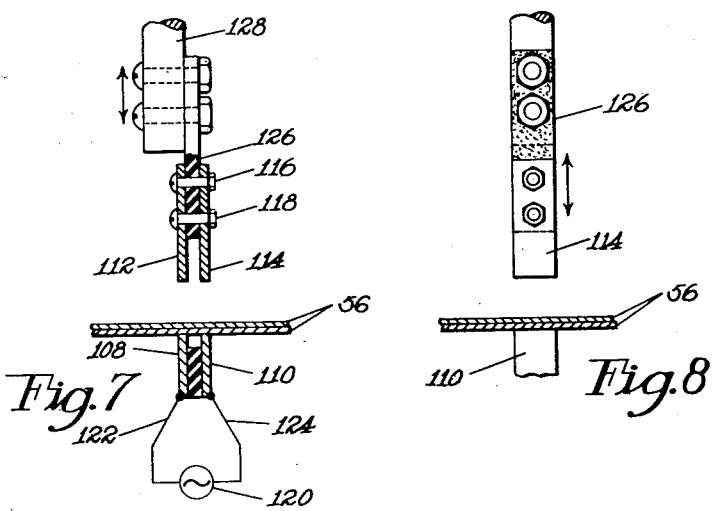
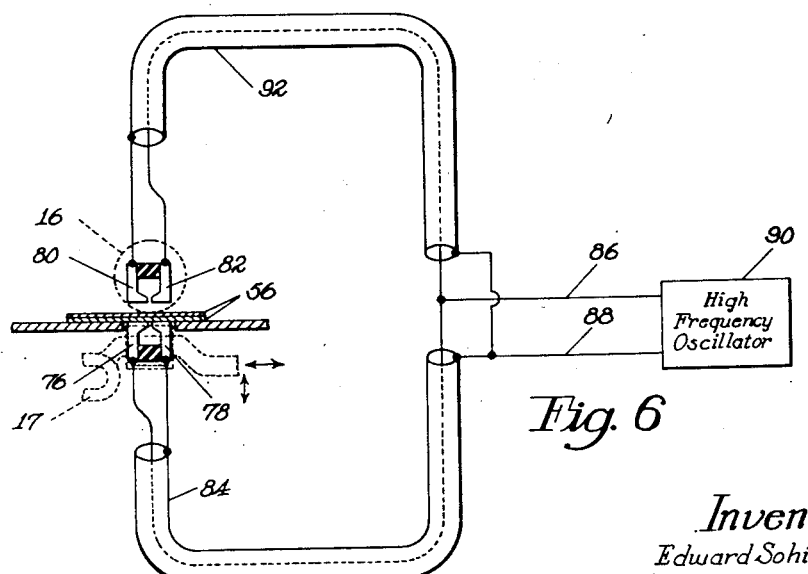

Patented Jan. 30, 1951

2,539,646

UNITED STATES PATENT OFFICE 2,539,646

HIGH-FREQUENCY PROGRESSIVE BONDING APPARATUS

Edward Sohier Welch, Jr., Framingham, Mass., assignor to United Shoe Machinery Corporation, Flemington, N. J., a corporation of New Jersey Application March 19, 1947, Serial No. 735,684

7 Claims. (Cl. 219—47)

This invention relates to high-frequency heating apparatus of a type adapted for progressively bonding work parts made up of thermoactive dielectric materials or parts coated with thermoactive adhesives, and more particularly to bonding electrodes and to high-frequency energy supply arrangements for apparatus of this type.

With high-frequency progressive bonding apparatus of the sewing machine type by reference to which the invention is herein described, the work parts, usually overlapping plastic sheets, are assembled and placed upon an operating table and then moved progressively past bonding electrodes which serve to subject the parts intermittently, in successive areas, to the heating effect of a high-frequency field and sometimes to the necessary bonding pressure. With most plastic materials the resulting seam thus formed will be as strong or stronger than the separate parts and may be made as watertight, for example, as the material itself, the seam being in the nature of a continuous weld.

Of present significance, in laying the groundwork for the description of this invention, is the fact that most of the uses of apparatus of the foregoing or a similar type require the provision of a relatively large working space around the bonding electrodes and the nearby work feed mechanism. This large working space is necessary, of course, in order to bond large work pieces which must be swung about freely without hindrance from physical obstacles comprising parts of the apparatus. However, with former proposals in which a large working space was in fact provided, long electrical leads were necessitated in serving one or more of the electrodes and it has been found that this resulted in energy losses arising from radiation from the leads. In one former proposal for a progressive bonding machine, incorporating this difficulty, roller electrodes were used between which the work was passed to form a bond. There the upper electrode was supported on a long overhanging arm necessarily embodying or carrying a long electrode supply lead. In apparatus representing another former proposal, later herein to be referred to in more detail, a stationary lower electrode positioned beneath the work was employed in cooperation with a reciprocating upper electrode moved intermittently into contact with the top surface of the work in timed relation with the operation of an intermittent work-feed mechanism. There also, the upper electrode was carried on a long overhanging arm or gooseneck and was supplied with energy over a long lead.

The foregoing indicated conflict between the interest in providing adequate working space, on the one hand, and the interest of reducing radiation losses, on the other, has been of a serious nature since the regulations of the Federal Communications Commission limit the permissible maximum amount of radiation which may be allowed to escape into "radio space," and because the radiation losses necessarily result in a reduction in the efficiency of the apparatus. Moreover, it was found that the difficulty was aggravated when it was sought to operate the oscillator at higher frequencies, since the radiation properties of the supply leads are usually measured in terms of their electrical length, and it has appeared that greater bonding speeds are possible with the use of higher frequencies.

It is accordingly an important object of the present invention to provide high-frequency progressive heating apparatus of a type adapted for bonding work parts of thermoactive materials, in which apparatus the amount of working space which may be provided around the bonding electrodes will not be limited by reason of the foregoing problem of radiation emitted from long supply leads.

A feature of the invention resides in high-frequency bonding apparatus comprising a first pair of electrode members positioned both on one side of the work, a second cooperating pair of electrode members positioned on the opposite side of the work, the members of the first said pair being served by a transmission line comprising two adjacent conductors interconnecting the said members in series with a source of high-frequency electric energy, and means for interconnecting the members of the cooperative pair of electrode members. It will be understood that by this feature substantially balanced currents flow in opposite directions in the adjacent conductors thereby reducing radiation therefrom.

In one embodiment the members of the cooperating electrode pair are directly interconnected by means spaced from the work surface and are coupled capacitatively through the work to the members of said first pair and hence do not require the use of a separate supply lead.

In another embodiment, the members of the second pair are interconnected and supplied in phase opposition to the members of the first pair by a separate transmission line preferably from the same source of energy and constituting a branch of the transmission line supplying the first pair. This arrangement permits the use of the full voltage available from the energy source in producing a direct field through the work.

Still another embodiment comprises two pairs of electrodes, one on either side of the work, each pair comprising a bonding electrode and an energy-coupling electrode of relatively larger area. The electrodes of one pair are connected by two adjacent conductors to the terminals of a source of high-frequency energy while the electrodes of the other pair are electrically connected together.

These and other features, objects and advantages of the invention will become more apparent from the following description taken in connection with the accompanying drawings in which Fig. 1 shows in front elevation a bonding machine of the sewing machine type in which the invention has been embodied;

Fig. 2 is a partial vertical section on a larger scale, through the operating portion of such a machine, showing the work feed members and the bonding electrodes;

Fig. 3 is a vertical section on the line III—III of Fig. 2 through the electrodes shown therein;

Fig. 4 is an end elevation of an alternative form of the electrodes and energy feed arrangement looking at the inner side thereof;

Fig. 5 is a front elevation of the electrodes of Fig. 4;

Fig. 6 illustrates another alternative form of the electrodes and of the means of feeding high-frequency energy thereto in a machine of the type shown in Fig. 1;

Figs. 7 and 8 are views of still another electrode and energy feed arrangement taken in the same way as Figs. 4 and 5.

Figure 1:
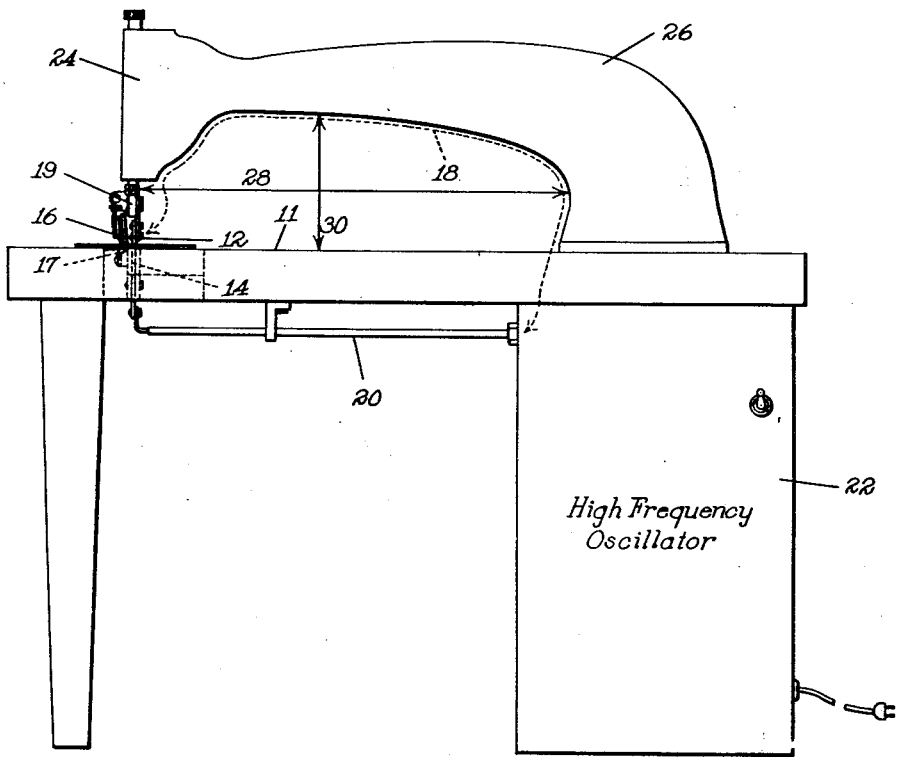

In the progressive bonding machine of Fig. 1, which embodies the invention and in many ways resembles the conventional sewing machine with its reciprocating needle bar and step-feed mechanism, the work parts to be bonded will be positioned on a table or bed 11 and fed progressively between electrodes 12 and 14. The feed motion will be imparted to the work by a reciprocating feed-dog 17 positioned beneath the work and assisted from above in its engagement of the work by a serrated presser wheel 16. The work will not be in motion during intervals when the upper electrode 12, carried by the "needle-bar" member 19, bears down against the work, and during such intervals the electrodes will be effective to heat the work parts and produce the necessary pressure to complete a bond.

Referring further briefly to the mechanical aspects of this machine, the member 19 and the presser wheel 16 are carried and operated in a conventional manner by apparatus mounted within a recessed head 24 formed at the end of a gooseneck member 26 attached to the base 11 of the machine. While this apparatus and the driving mechanism for the feed dog 17 are not shown herein, their construction and operation will be apparent to those familiar with the corresponding type of conventional sewing machine, and it will likewise be seen that the feed motion is an intermittent one, with the electrode 12 being moved up and down in timed relation with the movement of the work. A seam will thus be formed by a succession of overlapping or spaced bonds, the amount of spacing or overlap being determined by the feed stroke in relation to the length of the electrodes measured in the direction of work motion.

High-frequency energy is supplied to the electrodes from a high-frequency oscillator 22 over a parallel wire transmission line 20 extending to the electrode means on one side of the work, in this case, the lower side, in accordance with one form of the invention. But with former apparatus incorporating the difficulty aforementioned the transmission of energy in a machine of this general type would, for example, have been over a single lead extending between the oscillator and a lower electrode and perhaps occupying the same relative position as the line 20, and another lead extending between oscillator and upper electrode and, in most instances, occupying the position such as that of the dotted line 18 which has been introduced in the figure for the purpose of this illustration. The effect of this was to create a continuous radiating loop conductor formed by the leads extending between the respective electrodes and the oscillator and completed through the electrodes by the capacity effect through the work between the electrodes, the loop being energized effectively as an antenna by the high-frequency oscillator. The dimensions of this loop and hence the amount of radiation therefrom in a given case would depend on the required working space under the gooseneck member 26 and defined by the distances 28 and 30, horizontal and vertical, and the higher the frequency of the oscillator the greater would be the radiation effect. Therein lies the difficulty with former apparatus presented in a more specific manner.

In accordance with this invention one electrode means, positioned on one side of the work, will comprise a pair of separate coacting electrode members which cooperate with other electrode means positioned on the opposite side of the work. In the example of Figs. 2 and 3, a lower electrode pair, comprising members 32 and 34, which are positioned fairly closely together beneath the work, thus cooperates with a single electrode 36, coextensive in area with the pair and positioned above the work. For convenience in illustration, electrode members 32 and 34 are shown encased by an insulating member 38 and are held apart by another insulating member 40, the whole being embodied in and forming a part of the bed 11 of the machine, but these members may be mounted and insulated in any suitable way. The upper electrode 36 is carried by means of an insulating member 42 which may be attached at its upper end to the lower end of the member 19, as in the arrangement of Fig. 1. The electrode members 32 and 34 which may conveniently be shaped as shown to reduce their mutual capacity for greater ease in developing a high voltage between them, are supplied with high-frequency energy from a suitable oscillator 46, shown schematically, through leads 48 and 50 connected respectively to the output terminals of said oscillator. The work feed mechanism, provided in the form of the feed dog 17 which, in the conventional manner, is reciprocated back and forth horizontally and vertically, is assisted from above in its intermittent engagement of the work by a presser wheel 16. The feed stroke preferably is made of such length that a work area directly over the gap between electrode members 32 and 34 on one heating interval will be positioned over one of said members on the next interval, to form a continuously uniform seam, but this is not essential.

In the functioning of this apparatus the work parts 56 to be bonded are placed upon the table 11 between the presser wheel 16 and the feed dog 17 to be fed between the electrodes as in Fig. 1. The heating effect in the work occurs principally from the action of a direct field extending between the upper electrode 36 and the respective lower electrode members 32 and 34, which field arises by virtue of the effect of capacity coupling through the work between the upper and lower electrodes. The voltage of this field will be seen to be effectively one-half the voltage between the leads 48 and 50, there being a continuous circuit from the lead 50 and member 34 through the work to the upper electrode 36 and through the work again to the member 32 and the lead 48. A circulating or equalizing current will thus flow across the face of the electrode 36 which maintains the balance in voltage respectively between the members 32 and 34 and the electrode 36. A stray field will also be set up in the work, extending upwardly from between the electrode members 32 and 34, and this also will be of use in creating the bonding temperature necessary. It will be apparent, therefore, that the work is subjected both to a field and to pressure between upper and lower electrodes without the need of any external radiation-producing leads encircling the space under the gooseneck 26. The leads 48 and 50 may easily be made non-radiant since they may be relatively short and may comprise a parallel-wire or coaxial transmission line, which latter in no case will radiate. It follows that the supporting arm or gooseneck 26 for the upper electrode 36 and the presser wheel mechanism may be of any length without effect on the efficiency of the system.

In the arrangements of Figs. 4 and 5 an alternative electrode and energy feed system is provided, involving the use of two pairs of electrodes, a pair on either side of the work. In this embodiment as distinguished from Fig. 2, for example, substantially the full oscillator voltage is utilized effectively in heating the work in an area to be bonded, and the electrode members used directly in creating the bond are both single members positioned on opposite sides of the work. To this end the work parts 56 are acted upon by means of relatively small bonding electrodes 58 and 60. Energy-coupling electrodes 62 and 64, which are of relatively larger area, are provided to serve a special purpose later to be described. The electrodes 58 and 62, comprising a lower pair, are held between insulating pieces 65, the members of the electrode pair being connected to an oscillator source 66 of high-frequency energy through adjacent leads 68 and 70, while the electrodes 60 and 64, comprising an upper eectrode pair, are connected together mechanically and electrically by a conducting bar 72 integral with and extending between them while spaced from the work surface. The upper electrode pair will be mounted on a supporting member 74 of insulation material secured to the member 19 of Fig. 1 for reciprocation toward and away from the work, as in the arrangement previously described, while the lower electrode pair will be positioned in stationary manner beneath the work. The feed mechanism 16, 17, similar to that of Figs. 1 and 2, acts to feed the work preferably in the direction of the arrow past the electrodes.

In the manner of operation of Figs. 4 and 5, the energy-coupling electrodes 62 and 64 when positioned in mutual contact with the work serve as the plates of a condenser effectively coupling the upper bonding electrode 60 to the lead 70 for the purpose of establishing substantially the full oscillator voltage between the bonding electrodes 58 and 60. This is possible inasmuch as the area of the electrodes 62 and 64 is relatively greater than that of the bonding electrodes 58 and 60, and the former consume but a small proportion of the total voltage between the leads 68 and 70 while the latter account for the remainder. As a result, the work may be heated to plasticizing temperature between the bonding electrodes while it will be heated very little between the energy-coupling electrodes 62 and 64. Here, as in foregoing arrangements, the high-frequency oscillator 66 may be mounted in position close to the electrodes 58 and 62 and the leads 68 and 70 may thus be relatively short, if desired, comprising either a parallel-wire or coaxial transmission line which will not appreciablly radiate.

In the embodiment of Fig. 6 both the upper electrode means 80, 82 and the lower electrode means 76, 78 comprise electrode pairs constructed along the lines, for example, of the lower electrode members 32 and 34 of Figs. 2 and 3. In this instance, both members of the pairs, in interrelation, act as bonding electrodes, thereby differing from those members of Fig. 4, and, in another differentiating aspect, they are individually connected through transmission means 92 and 84 to the terminals of a high-frequency oscillator. The connections are such that the members of a pair are of opposite polarity and corresponding members of the opposing pairs are oppositely phased. In this embodiment the direct field intensity produced in the work corresponds to the full oscillator voltage, as it does substantially in Figs. 4 and 5, but without the need of energy-coupling electrodes in accomplishing the result. The electrode members 76 and 78 of the lower pair are connected in any convenient manner not producing radiation, such as by means of the conductors of a coaxial transmission line 84, to output leads 86 and 88 of a high-frequency oscillator 90 and the upper electrode members 80 and 82 are similarly connected, but with reversed polarity, to these leads through a section of coaxial transmission line 92. For impedance matching purposes, the line 92 is made preferably of the same length as the line 84, although it may differ therefrom by a whole number of half wavelengths, assuming the electrical impedances presented by the upper and lower electrode pairs are substantially equal. Here likewise the work may be fed past the electrodes conveniently by means of a presser wheel 16 and feed dog 17, while the upper electrode pair comprising the members 80 and 82 may be suitably supported for reciprocation toward and away from the work in timed relation with the work-feed motion. It will be apparent that this arrangement also avoids the loss of energy through radiation effects since the leads and transmission lines employed may be of types which will not radiate.

To illustrate another of the many forms which the invention may assume, separately insulated lower electrode members 108 and 110 are shown in Figs. 7 and 8 and upper electrode members 112 and 114 connected together both mechanically and electrically by means of bolts 116 and 118 cooperate with them. A high-frequency oscillator 120 is connected to the electrodes 108 and 110 by means of leads 122 and 124 which may comprise a parallel-wire transmission line or a coaxial transmission line, thereby avoiding radiation. The electrodes are arranged for producing a double-line seam, the work parts 56 being moved from left to right (Fig. 8). The upper electrode members 112 and 114 are mounted on an insulating member 126 carried at the end of a vertically reciprocating bar 128 such as that employed in connection with the foregoing examples. The electrical principle determining the intensity of the direct field established between the corresponding upper and lower electrode members is similar to that of Figs. 2 and 3, one-half of the voltage of the leads 122 and 124 appearing respectively between the electrode members 112 and 108 and between the members 110 and 114, the members 112 and 114 being at the same electrical potential because of the bolts 116 and 118.

To provide a greater direct field intensity between upper and lower electrode members for a given voltage between the leads 122 and 124, as in the example of Fig. 6, the upper electrode members 112 and 114, of Figs. 7 and 8, may be insulated from each other and connected respectively to the conductors of a transmission line provided for that purpose, extending to the output terminals of the high-frequency oscillator 120, the polarity being the reverse of that of the lower electrode members 108 and 110.

Figure 9:
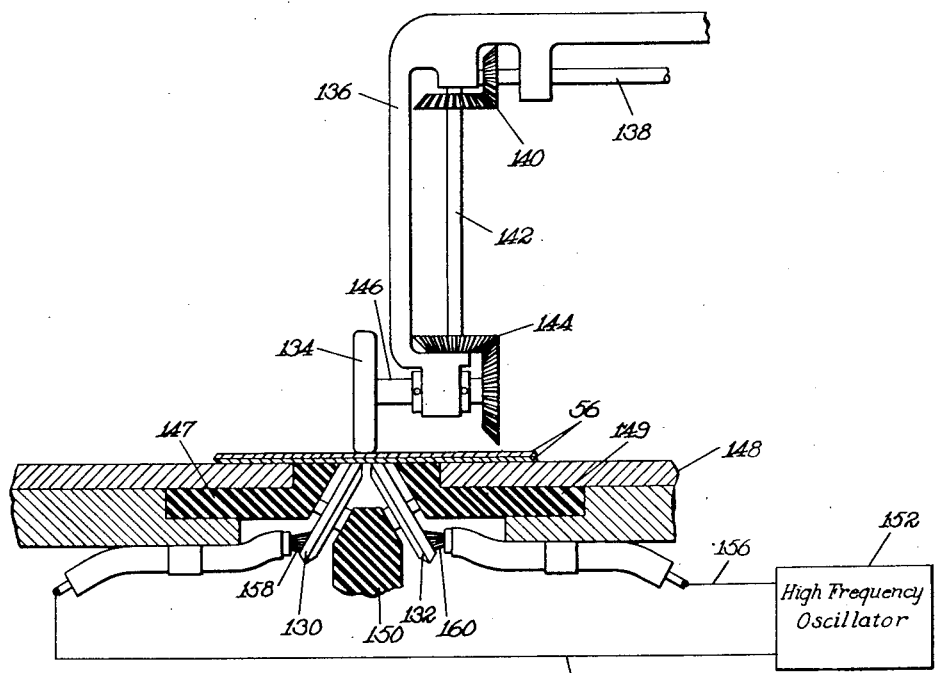
Fig. 9 illustrates the invention as applied to roller type electrodes in a machine of a different type.

To illustrate still another form of the invention, where it is desirable to provide a machine with a continuous work feed motion, as distinguished from the step-by-step feed motion, roller electrodes may be employed, as in Fig. 9 which is a view of the operating end of such a machine looking in the direction of movement of the work. In this machine roller electrodes 130 and 132, which are preferably inclined to each other to reduce their mutual capacitance without increasing the width of the bond, are positioned side by side beneath the work to cooperate with an upper metallic roller 134 which serves both as an electrode and as a means of feeding the work. For this purpose the roller electrode 134 is supported on a frame 136 which carries a gear and shaft transmission system comprising a horizontal drive shaft 138 receiving power from any suitable means not shown, bevel gears 140, a vertical coupling shaft 142, bevel gears 144 and a driven shaft 146 carrying the roller electrode 134. The lower roller electrodes 130 and 132 are conveniently mounted with shafts supported in insulating members 147 and 149 secured to and forming part of the bed 148 of the machine for supporting the work parts 56 and in an insulating member 150. The electrodes 130 and 132 are supplied with high-frequency energy from an oscillator 152 through leads 154 and 156 with the aid of sliding contacts 158 and 160 which individually comprise a bundle of fine, springy wires, arranged respectively to bear against one side of each of the roller electrodes. Spring means (not shown), may be provided to urge the upper electrode against the work for producing the desired bonding pressure and for producing traction in feeding the work.

In the operation of this machine, high-frequency energy may be supplied continuously to the electrodes, so that with continuous driving motion of the upper roller electrode 134 an unbroken or continuous seam may be produced between the work parts 56. Likewise one-half of the voltage appearing between the electrodes 130 and 132 appears in the production of a direct field between these members and the upper electrode member 134. If it should be desired to increase this voltage, according to the principles of Fig. 6, the upper roller electrode 134 may be replaced by two coaxial roller electrode members of the same diameter and separately insulated which may then be connected respectively to the conductors of a parallel-wire or coaxial transmission line, thence to the terminals of the high-frequency oscillator 152, as in Fig. 6.

It is to be noted, particularly with reference to the arrangements of Figs. 3, 4, 7 and 9, that the upper electrode member or members need not be insulated from the machine, although shown as such, but may be grounded to the frame of the machine. This may be done, in particular accord with the principles of the invention, provided the source of high-frequency energy in each case has output terminals neither of which is grounded but which are balanced with respect to ground so that there will be no appreciable circulating current flowing through the frame of the machine to produce radiation. This and other departures from the specific forms and arrangements herein set forth may be employed within the scope of the invention.

Having thus described my invention, what I claim as new and desire to secure by Letters Patent of the United States is:

1. In apparatus for progressively bonding work parts by means of a high-frequency field, the combination comprising a first pair of spaced electrode members positioned both on one side of the work, a second pair of spaced electrode members positioned on the other side of the work opposite said first pair, a work-feed mechanism for establishing relative motion between said electrode members and the work, a transmission line comprising two adjacent conductors for electrically interconnecting the members of said first pair in series with a source of high-frequency electric energy, and means for electrically interconnecting the members of said second pair, said means being spaced from the work surface during engagement of the work by the last said members.

2. In apparatus for progressively bonding work parts by means of a high-frequency field, the combination comprising a work support, a first pair of spaced electrode members associated with said support on one side of the work, a second pair of electrode members positioned opposite said first pair of electrode members on the other side of the work, mechanism for carrying and for reciprocating one pair toward and away from the work, work feed mechanism for imparting step-by-step motion to the work in timed relation with the movement of said electrode means, a transmission line comprising two adjacent conductors for electrically interconnecting the members of said first pair in series with a source of high-frequency electric energy, and means for electrically interconnecting the members of said second pair, said means being spaced from the work surface during engagement of the work by the last said members.

3. In apparatus of the class described, the combination comprising a first pair of electrode members positioned both on one side of the work, a second cooperative pair of electrode members positioned both on the other side of the work opposite said first pair, and adjacent conductor energy transmission means having branches for connecting a source of high-frequency energy respectively to said pairs of electrode members, the members of a pair being supplied oppositely in phase and opposing members of said pairs being oppositely phased.

4. Apparatus as in claim 3 in which said branches are effectively of equal electrical length.

5. In apparatus of the class described, the combination comprising a first pair of electrode members positioned both on one side of the work, a second pair of electrode members positioned on the opposite side of the work to cooperate with the first pair, means for supporting one pair and for intermittently reciprocating said pair toward and away from the work, cooperating work-feed mechanism for imparting step-by-step motion to the work in timed relation with the operation of said supporting-and-reciprocating means, and an adjacent conductor transmission line having branches for connecting high-frequency energy supply means, with opposite phasing, respectively to corresponding members of said pairs, the work being subjected to pressure and to the heat of a field between the electrodes during periods when it is not in motion.

6. In apparatus for progressively bonding work parts by means of a high-frequency field, the combination comprising a first electrode pair having a bonding electrode and a relatively larger energy-coupling electrode positioned both on one side of the work, a second and cooperative electrode pair correspondingly having a bonding electrode and a relatively larger energy-coupling electrode positioned both on the other side of the work, high-frequency energy supply means having output terminals connected respectively, by an adjacent conductor transmission line, to the electrodes of one of said pairs, and means connecting together electrically the electrodes of the other of said pairs.

7. Apparatus as in claim 6 in which carrier means are provided for one of said electrode pairs for the reciprocation of said pair toward and away from the work, and work-feed mechanism is provided for imparting a step-by-step motion to the work relative to said electrodes in timed relation with the reciprocating movement of said carrier means, the work being subjected to heat and to pressure between said bonding electrodes intermittently during periods when it is not in motion.

EDWARD SOHIER WELCH, Jr.

REFERENCES CITED

The following references are of record in the file of this patent:

UNITED STATES PATENTS

| Number | Name | Date |
| --- | --- | --- |
| 2,321,131 | Crandell | June 8, 1943 |
| 2,342,846 | Crandell | Feb. 29, 1944 |
| 2,432,412 | Hacklander | Dec. 9, 1947 |
| 2,434,966 | Sherman | Jan. 27, 1948 |
| 2,459,260 | Brown | Jan. 18, 1949 |
| 2,469,990 | Quayle et al. | May 10, 1949 |
| 2,474,420 | Himmel | June 28, 1949 |
| 2,477,313 | Quayle et al. | July 26, 1949 |